Sept. 28, 1965　　　　R. W. WARFIELD　　　　3,209,249
METHOD OF INDICATING THERMAL STABILITY OF BULK POLYMERS
Filed Oct. 26, 1961　　　　　　　　　　　　　　4 Sheets-Sheet 1

ISOTHERMAL DEGRADATION OF
POLYURETHANE POLYMER AT 184°C.

INVENTOR.
ROBERT W. WARFIELD

Sept. 28, 1965   R. W. WARFIELD   3,209,249
METHOD OF INDICATING THERMAL STABILITY OF BULK POLYMERS
Filed Oct. 26, 1961   4 Sheets-Sheet 2

INVENTOR.
ROBERT W. WARFIELD
BY
ATTYS.
AGENT.

FIG.6. TEMPERATURE DEPENDENCE OF THE ELECTRICAL RESISTIVITY OF EPOXYLATED-NOVOLAC POLYMER AFTER PYROLYSIS FOR 16 HOURS AT VARIOUS TEMPERATURES

FIG.5. TEMPERATURE DEPENDENCE OF THE ELECTRICAL RESISTIVITY OF EPOXYLATED-NOVOLAC POLYMER AFTER PYROLYSIS FOR 16 HOURS AT VARIOUS TEMPERATURES

Sept. 28, 1965   R. W. WARFIELD   3,209,249
METHOD OF INDICATING THERMAL STABILITY OF BULK POLYMERS
Filed Oct. 26, 1961   4 Sheets-Sheet 4

FIG. 8. TEMPERATURE DEPENDENCE OF THE ELECTRICAL RESISTIVITY OF SILICONE POLYMER AFTER EXTENSIVE PYROLYSIS

FIG. 7. TEMPERATURE DEPENDENCE OF THE ELECTRICAL RESISTIVITY OF SILICONE POLYMER AFTER PYROLYSIS FOR 16 HOURS AT VARIOUS TEMPERATURES

INVENTOR.
ROBERT W. WARFIELD
BY
ATTYS.
AGENT.

United States Patent Office 3,209,249
Patented Sept. 28, 1965

3,209,249
METHOD OF INDICATING THERMAL STABILITY OF BULK POLYMERS
Robert W. Warfield, Germantown, Md., assignor to the United States of America as represented by the Secretary of the Navy
Filed Oct. 26, 1961, Ser. No. 148,004
4 Claims. (Cl. 324—65)
(Granted under Title 35, U.S. Code (1952), sec. 266)

The invention described herein may be manufactured and used by or for the Government of the United States of America for governmental purposes without the payment of any royalties thereon or therefor.

This invention relates to a method for indicating the thermal stability and thermal degradation characteristics of bulk polymers, propellants and propellant binders. More specifically, the invention relates to the indication of such characteristics by measuring the electrical volume resistivity of such bulk polymers, propellants and propellant binders under conditions of pyrolysis.

The use of bulk polymers, often under conditions of high temperature, is rapidly increasing but information on the thermal stability of this class of polymers is very limited. A few investigations employing the known techniques of Differential Thermal Analysis (DTA) and Thermo-Gravimetric Analysis (TGA) have been made but the number of polymers investigated by these techniques is still small. These experimental techniques, while useful in elucidating the kinetics and mechanisms of thermal degradation, yield a limited amount of information on the structure and other characteristics of degraded polymers at various steps during the degradation process.

A knowledge of the changing structure of a polymer during pyrolysis is of great importance in high temperature technological applications. Neither DTA nor TGA yields structural data on the polymer during pyrolysis, the former yielding information on the magnitude and temperature dependence of the thermal reactions occurring within the polymer while the latter yields data on the loss in weight of the polymer during degradation. Moreover, both techniques require specially prepared samples and are not suited to yield information on the degradation characteristics of bulk polymers.

It has now been found that thermal degradation studies of bulk polymers may be made by an electrical resistivity technique and that data obtained by this technique may be applied in a novel manner to follow the onset, rate and extent of degradation of the bulk material. Information is also obtained on the nature of the carbonaceous or silicious residue (depending on whether the degraded polymer is hydrocarbon or silicone) which remains after completion of the degradation. This new analytical technique, hereinafter referred to as Electro-Thermal Analysis (ETA) has been employed to study the degradation of typical thermosetting polymers but is not limited to such class of polymers. It is a particularly noteworthy advantage of this new technique that the bulk polymer may be studied.

It is therefore an object of this invention to provide a novel analytical technique for the study of bulk polymers.

It is a further object to provide a method for indicating the thermal stability of bulk polymers, propellants and propellant binders.

It is still another object to provide a method for indicating the degradation characteristics of bulk thermosetting polymers, propellants and propellant binders.

Yet another object is to provide a method for indicating the thermal stability and degradation characteristics of bulk polymers, propellants and propellant binders by measurement of the electrical resistivity of such bulk polymers, propellants and propellant binders under conditions of pyrolysis.

It is a further object to provide a novel method for monitoring the degradation of solid propellants.

Other objects and many of the attendant advantages of this invention will be readily appreciated as the same becomes better understood by reference to the following detailed description when considered in connection with the accompanying drawings in which.

Figure 1:
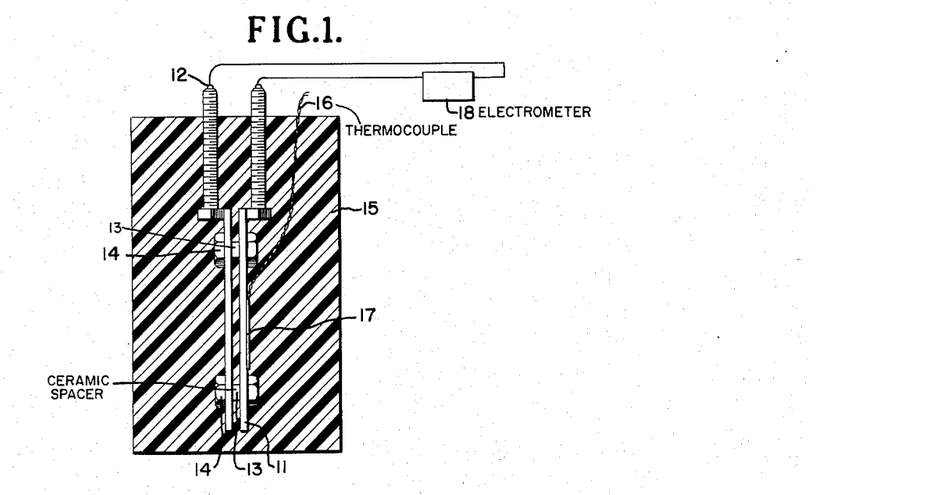
FIG. 1 is a cross-sectional view, partly in elevation, of the apparatus used to measure the resistivity of samples of bulk, thermosetting polymer undergoing pyrolysis.

Referring now to the drawings, there is shown in FIG. 1, two brass parallel-plate electrodes 11, each having a bolt attached to the upper end thereof to function as a lead 12. The electrodes are separated by ceramic spacers 13, which are threaded at both ends to receive metal nuts 14, said spacers being held in place thereby.

The electrodes are embedded within polymer 15 and thermocouple 16 is attached to, but insulated from, electrode 11 by a heat resistant material such as glass tape 17 to permit continuous measurement of the temperature of the polymer at the electrodes.

Electrometer 18 is connected across leads 12 to measure current flow.

The thermal degradation of bulk polymers is extremely complex. Carbon, which is the end product of the pyrolysis of an organic polymer, which may or may not be crosslinked, exhibits a zero or slightly negative temperature dependence of electrical volume resistivity. The magnitude of the resistivity is in the semiconductor range, i.e., about $10^7$ ohm-cm.

Upon pyrolysis these polymers are progressively converted into a carbonaceous residue which may, in turn, be converted into graphite upon further heating to very high temperatures. This progressive conversion of a polymer into carbon by pyrolysis can be measured. Completely polymerized polymers exhibit maximum values of magnitude and temperature dependence of their electrical resistivity and it is now believed that the decrease in these parameters after extended high temperature pyrolysis is approximately proportional to the extent of pyrolysis.

The reasons for the changing electrical properties of a polymer, as a result of pyrolysis, are only partly understood. A partial explanation of this phenomenon may be explained by the fact that electrical conduction in organic polymers is predominantly ionic in nature while that in carbon is electronic and, for the most part, independent of temperature. Thus, as pyrolysis proceeds the amount of carbon in the polymer increases while at the same time the organic portions of the polymer are burned off. The net effect then, of pyrolysis, is the conversion of the organic polymer to a form of carbon. Therefore, with increasingly severe pyrolysis, a polymer will undergo a progressive decrease in the magnitude and temperature dependence in its resistivity. The magnitude of the resistivity will approach that of carbon, i.e. $10^5$ to $10^7$ ohm-cm. while the temperature dependence will approach a flat or a zero dependence. This progressive pyrolytic conversion of a bulk thermosetting polymer to a form of carbon can be measured by resistivity techniques and forms the basis of this invention. The pyrolysis may be conducted isothermally or non-isothermally.

Degradation is determined by repeatedly measuring, after each pyrolysis cycle, the temperature-dependence of the resistivity over a temperature range, the maximum value of which is the highest temperature for which a reading is obtainable on the electrometer, and the minimum value of which is about 25° C. The arbitrarily chosen pyrolysis cycles vary from 16 to 24 hours and the temperature is increased at least about 15° C. for each cycle. Thus, dependence on temperature is determined by measuring the resistivity at intervals of time as the pyrolysate is slowly cooled, after each pyrolysis cycle, from its maximum temperature down to about 25° C. Onset of thermal degradation is shown by a decrease in the previously established maximum magnitude of resistivity and its temperature dependence. Pyrolysis is then conducted at progressively higher temperatures until the residue exhibits the electrical properties of carbon.

Indication of the thermal stability and degradation characteristics of any bulk polymer may be obtained by the electrical resistivity technique (ETA). Typical bulk polymers are epoxylated-novolac resins, fluorinated hydrocarbon resins, silicone resins and polyurethane and polyepoxide resins.

Epoxylated-novolac resins, such as D.E.N. 438 (Dow Chemical Corp.) may be represented by the following structural formula:

where $n$ may vary from 0.1 to 1.5.

Fluorinated hydrocarbon resins, such as Stycast TPM-4 (Emerson and Cuming Co.), are essentially carbon chains wherein a plurality of the hydrogen atoms have been replaced by fluorine atoms, the carbon chain may be modified to contain, for example, phenyl groups.

Silicone resins, such as RTV-60 (Gen. Elec. Corp.), consist of methyl and phenyl groups attached to silicon atoms in a silicon-oxygen chain and may be represented by the following generalized structural formula wherein one or more methyl groups may be replaced by phenyl groups:

Epoxide resins, such as Thermalam 1255 (Hastings Plastics, Inc.), are amine-cured epoxide polymers formed by the reaction of epichlorohydrin with bis(4-hydroxyphenyl) dimethylmethane in a molar ratio of about 2 to 1. Such epoxide polymers may be represented by the following generalized structural formula:

wherein $n$ may vary from 1 to 3.

Polyurethane resin is the reaction product of a polyester glycol and 2,4-tolylene diisocyanate and may be represented by the following generalized structural formula:

Obviously, the particular composition of the polymers is not critical as regards ETA. It is necessary, however, that the polymer be in bulk form.

The catalysts used in the polymerization of the resins are not critical and include any catalysts known to those skilled in the art. The types of catalysts which may be used include organometal compounds such as dibutyl tin dilaurate, organic amine-type catalysts such as m-phenylene diamine and peroxide catalysts such as benzoyl peroxide. Obviously, any catalyst capable of polymerizing the particular resin under consideration may be used.

The particular apparatus which was used to determine the electrical volume resistivity of the polymers before (i.e. during polymerization), during (isothermal) and after (non-isothermal) pyrolysis was the continuous current monitoring device (CCMD). This device consists of a Keithley model 210 electrometer, a Keithley model 2008 decade shunt and as shown in FIG. 1 a cell made of two brass parallel-plate electrodes, the electrodes being completely embedded in the polymer. All values of volume resistivity were made at a field strength of about 225 volts per centimeter.

The electro-thermal analysis may be conducted in two different manners. The first, or non-isothermal case, consists of the progressive pyrolysis of the polymer and the determination of the magnitude and temperature dependence of the resistivity after each pyrolytic treatment. The second, or isothermal case, consists of thermally degrading the polymer for long periods of time, in an oven or furnace, at a single elevated temperature while continuously determining the resistivity. One advantage of the isothermal technique is that from a series of isothermal pyrolyses conducted at different temperatures, on a number of samples, it would be possible to calculate various kinetic parameters for the degradation of the polymer under study.

A detailed description of the non-isothermal and isothermal ETA techniques follows:

NON-ISOTHERMAL

A thermocouple is taped to, and insulated from, one of the electrodes with a heat resistant material such as glass tape. The electrode is then suspended in a mold and a mixture of the unpolymerized resin and a polymerization catalyst therefor is poured into the mold. The resin is then polymerized, at least partially, to a solid by heating it in an oven. The polymerization time or temperature is not critical and would vary, depending on the resin under consideration. Similarly, the catalyst is not critical. When the resin appears to have solidified, it is removed from the oven and the mold is stripped off. The resistivity of the now solid polymer is then taken, at intervals of time, while the polymer cools to about room temperature. The polymer is then replaced in the oven and heated to a temperature at least about 15° C. higher than the maximum polymerization temperature, again removed from the oven and allowed to cool at ambient temperature, the resistivity of the polymer being recorded at intervals of time during the cooling period. This cyclic process of heating and cooling is repeated successively, the temperature being raised about 15° (or more) during each heating cycle, until the polymer exhibits the zero or slightly negative temperature dependence of the resistivity which is characteristic of carbon or impure silica, depending upon whether the polymer is of the hydrocarbon type or silicone type. The resistivity data points of each cooling cycle are then plotted against the reciprocal of the absolute temperature at which the data points were obtained, but not against the pyrolysis temperature. The data points resulting from each successive pyrolysis cycle are connected by a drawn line to form a plot. The pyrolysis temperature corresponding to the plot having the maximum slope represents the temperature at which the polymer has maximum thermal stability for the particular period of time of pyrolysis.

ISOTHERMAL

The preliminary procedure for the non-isothermal technique is followed. After at least partial polymerization, the now solid resin is taken from the mold, replaced in the oven and heated at a constant temperature. If, during the preliminary heating treatment, only partial polymerization occurred, there would be additional polymerization undergone by the polymer after being replaced in the oven and the resistivity will increase and approach a constant value as polymerization is completed. The polymer is then heated, isothermally, at progressively higher temperatures, the resistivity being plotted semilogarithmically against time after each isothermal heating cycle. The onset of degradation is indicated by a progressive decrease in the resistivity values taken during the isothermal heating cycle at which degradation temperature is attained.

The non-isothermal technique may be used to indicate the thermal stability of a polymer for a short duration of time and the isothermal technique may be used to indicate the thermal stability of a polymer for a long duration of time.

For instance, if one were given the problem of finding that temperature at which a certain polymer would be thermally stable for ten hours, one would embed the electrode in, and polymerize, the appropriate resin and then record the resistivity of the polymer as it was heated at progressively higher temperatures in ten hour cycles. That temperature during which the data points, when plotted, would form a plot having maximum slope, would be the temperature of maximum thermal stability.

If one were then given the problem of determining if that same polymer would be thermally stable for 2,000 hours at the above-determined temperature, one would use the isothermal technique and pyrolyze the polymer at the indicated temperature for 2,000 hours. A level plot would indicate thermal stability.

Given the problem of finding the long range thermal stability of a polymer, one would combine the non-isothermal and isothermal techniques by first running a non-isothermal pyrolysis on a sample to quickly determine the initial breakdown temperature. One would then run a series of simultaneous isothermal analyses, varying the time and temperature of each run. In this manner the long range thermal stability of the polymer would be indicated.

Further, ETA may be used to study reentry problems of missile nose cones composed of thermosetting polymers. By simulating reentry degradation conditions, resistivity measurements may be made of the polymers used in the nose cone.

A further distinctive feature of ETA is that it provides a method of pyrolysis which may be conducted in the absence of air, without resorting to the use of special equipment for excluding the atmosphere.

The results of pyrolysis in the presence and absence of air do not coincide, since oxygen effects the degradation mechanism of the polymer. Heretofore, it has been necessary to either conduct pyrolyses in vacuo or under a special atmosphere such as nitrogen. By the present method, however, the pyrolyses are conducted in the absence of air but neither vacuum nor special atmosphere is needed since the pyrolysis measurements are taken at the electrode and the solid block of polymer effectively excludes the atmosphere.

Special notice should also be taken of the fact that the use of ETA does not preclude post-degradation studies of the polymer, since the carbonaceous residue is readily studied and may yield valuable data relating to polymer structure and performance.

Analytical methods used prior to ETA were disadvantageous in that only small (micro-gram) quantities were available for study. By the present method, however, this problem is overcome.

Post-degradation studies may include tests of tensile strength, elongation, modulus, dielectric constant and others. Free radicals may be studied by nuclear magnetic resonance and proton magnetic resonance determinations.

The invention is further illustrated, but not limited, by the following specific examples which illustrate Electro-Thermal Analysis.

Example I is illustrative of isothermal degradation while Examples II through VI illustrate non-isothermal degradation.

*Example I*

After polymerization and cross-linking with castor oil, the sample was isothermally pyrolyzed as set forth above. The data are set forth in Table I and FIG. 2.

TABLE I—DEGRADATION OF POLYURETHANE POLYMER AT 184° C

| Time (Min.) | Current (Amps) | Resistance (Ohms) | Resistivity |
| --- | --- | --- | --- |
| 120 | $4.8 \times 10^{-6}$ | $8.4 \times 10^6$ | $7.2 \times 10^8$ |
| 158 | $4.9 \times 10^{-6}$ | $8.2 \times 10^6$ | $7.1 \times 10^8$ |
| 175 | $5.0 \times 10^{-6}$ | $8.0 \times 10^6$ | $6.9 \times 10^8$ |
| 205 | $5.1 \times 10^{-6}$ | $7.8 \times 10^6$ | $6.7 \times 10^8$ |
| 225 | $5.3 \times 10^{-6}$ | $7.5 \times 10^6$ | $6.5 \times 10^8$ |
| 270 | $5.7 \times 10^{-6}$ | $6.9 \times 10^6$ | $5.8 \times 10^8$ |
| 310 | $6.0 \times 10^{-6}$ | $6.5 \times 10^6$ | $5.6 \times 10^8$ |
| 330 | $6.3 \times 10^{-6}$ | $6.1 \times 10^6$ | $5.3 \times 10^8$ |
| 370 | $6.4 \times 10^{-6}$ | $6.0 \times 10^6$ | $5.2 \times 10^8$ |
| 540 | $1.0 \times 10^{-5}$ | $4.4 \times 10^6$ | $3.9 \times 10^8$ |
| 670 | $1.2 \times 10^{-5}$ | $3.7 \times 10^6$ | $3.1 \times 10^8$ |
| 890 | $1.7 \times 10^{-5}$ | $2.5 \times 10^6$ | $2.1 \times 10^8$ |
| 915 | $1.8 \times 10^{-5}$ | $2.4 \times 10^6$ | $2.0 \times 10^8$ |
| 980 | $2.0 \times 10^{-5}$ | $2.2 \times 10^6$ | $1.9 \times 10^8$ |
| 1,045 | $2.2 \times 10^{-5}$ | $1.9 \times 10^6$ | $1.7 \times 10^8$ |

Figure 2:
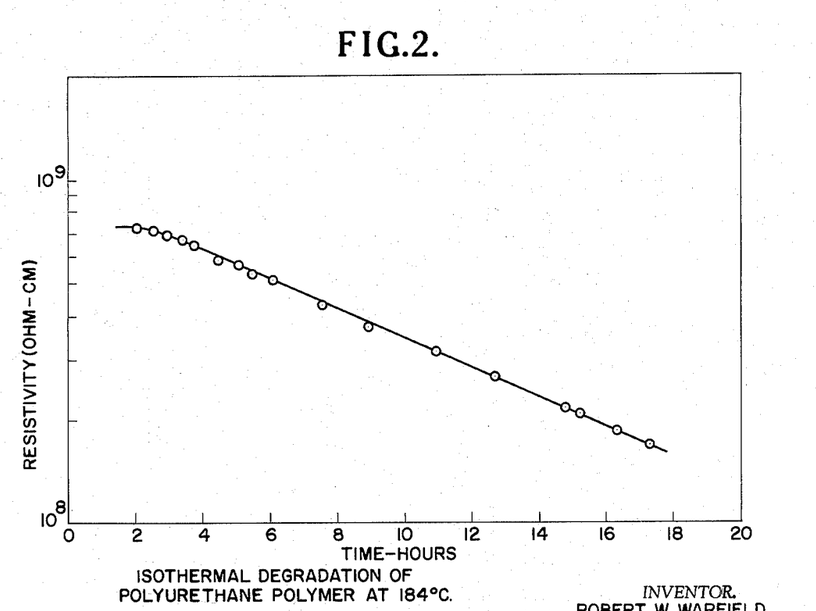
FIG. 2 is a graph showing the electrical resistivity plotted as a function of the time at which the data points were taken for an isothermal degradation of a polyurethane polymer.

As is shown by the initial horizontal or level portion of the curve in FIG. 2, the polymer had reached a complete cure. Had it not been completely cured, the curve would have exhibited an upward slope. Shortly after complete cure, the downward slope of the curve indicates degradation. It is obvious that this polymer is not thermally stable at 184° C. This temperature is above the potential energy barrier to degradation of the polymer and as polymeric bonds and functional groups are destroyed by the thermal energy input, the current carriers are able to diffuse more readily through the polymer. This is exhibited by the decreasing resistivity. This decreasing resistivity indicates that the internal viscosity of the polymer has become less and, correspondingly, the free volume has become greater. The change of the logarithm of the resistivity with time is proportional to the breakdown of the polymer and the ease of diffusion of the current carriers.

*Example II*

The resin was polymerized with about 35 percent, by weight, of an organic amine catalyst and pyrolyzed non-isothermally. (See Table II.)

Figure 3:
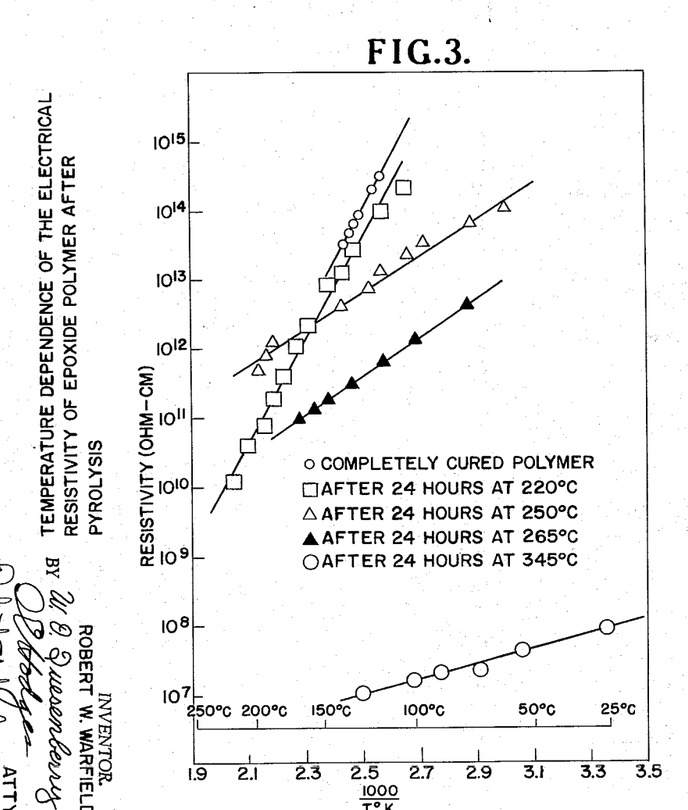
FIG. 3 is a graph prepared by plotting the electrical resistivity as a function of the reciprocal of the absolute temperature at which the data points were obtained for a series of non-isothermal degradations of an epoxide polymer.

As is shown by the data in Table II and by FIG. 3, the polymer exhibited progressive degradation as the pyrolysis temperature was increased, and an accompanying decrease in the magnitude and temperature dependence of the electrical volume resistivity. The thermal degradation of this polymer is especially interesting because the expected flat or zero temperature dependence of the resistivity, characteristic of carbon, was approached by the degraded residue. Also, the magnitude of the resistivity exhibited a considerable decrease between the results obtained after pyrolysis at 265° C. and those obtained after pyrolysis at 345° C. From the data obtained it is seen that this polymer exhibited temperatures below degradation at 260° C.

TABLE II.—DEGRADATION OF EPOXIDE POLYMER
(24 Hours)
[Pyrolysis Temp.: 220° C.]

| Cooling Temp. (° C.) | Current (Amps) | Resistance (Ohms) | Resistivity |
|---|---|---|---|
| 208 | $1.7 \times 10^{-7}$ | $2.6 \times 10^{8}$ | $2.2 \times 10^{10}$ |
| 160 | $1.8 \times 10^{-9}$ | $2.4 \times 10^{10}$ | $2.1 \times 10^{12}$ |
| 147 | $4.0 \times 10^{-10}$ | $1.0 \times 10^{12}$ | $8.8 \times 10^{12}$ |
| 131 | $1.4 \times 10^{-10}$ | $3.1 \times 10^{11}$ | $2.7 \times 10^{13}$ |
| 106 | $2.2 \times 10^{-11}$ | $1.9 \times 10^{12}$ | $1.7 \times 10^{14}$ |

[Pyrolysis Temp.: 250° C.]

| Cooling Temp. (° C.) | Current (Amps) | Resistance (Ohms) | Resistivity |
|---|---|---|---|
| 234 | $1.1 \times 10^{-7}$ | $4.1 \times 10^{8}$ | $3.5 \times 10^{10}$ |
| 200 | $0.9 \times 10^{-8}$ | $4.9 \times 10^{9}$ | $4.2 \times 10^{11}$ |
| 164 | $2.0 \times 10^{-9}$ | $2.2 \times 10^{10}$ | $1.9 \times 10^{12}$ |
| 99 | $2.4 \times 10^{-10}$ | $1.8 \times 10^{11}$ | $1.5 \times 10^{13}$ |
| 56 | $0.7 \times 10^{-10}$ | $6.1 \times 10^{11}$ | $5.2 \times 10^{13}$ |

[Pyrolysis Temp.: 265° C.]

| Cooling Temp. (° C.) | Current (Amps) | Resistance (Ohms) | Resistivity |
|---|---|---|---|
| 246 | $0.8 \times 10^{-6}$ | $5.5 \times 10^{7}$ | $4.8 \times 10^{9}$ |
| 206 | $2.0 \times 10^{-7}$ | $2.2 \times 10^{8}$ | $1.9 \times 10^{10}$ |
| 182 | $0.8 \times 10^{-7}$ | $5.5 \times 10^{8}$ | $4.8 \times 10^{10}$ |
| 134 | $1.2 \times 10^{-8}$ | $3.7 \times 10^{9}$ | $3.1 \times 10^{11}$ |
| 76 | $1.0 \times 10^{-9}$ | $4.4 \times 10^{10}$ | $3.8 \times 10^{12}$ |

[Pyrolysis Temp.: 345° C.]

| Cooling Temp. (° C.) | Current (Amps) | Resistance (Ohms) | Resistivity |
|---|---|---|---|
| 127 | $3.5 \times 10^{-4}$ | $1.2 \times 10^{5}$ | $1.0 \times 10^{7}$ |
| 100 | $2 \times 10^{-4}$ | $2.1 \times 10^{5}$ | $1.8 \times 10^{7}$ |
| 87 | $1.9 \times 10^{-4}$ | $2.3 \times 10^{5}$ | $2.0 \times 10^{7}$ |
| 36 | $6.6 \times 10^{-5}$ | $5.8 \times 10^{5}$ | $5.0 \times 10^{7}$ |
| 25 | $3.8 \times 10^{-5}$ | $1.1 \times 10^{6}$ | $9.0 \times 10^{7}$ |

*Example III*

Again, the non-isothermal technique was used.

TABLE III.—DEGRADATION OF FLUORINATED HYDROCARBON POLYMER (16 HOURS)
[Pyrolysis Temp.: 288° C.]

| Cooling Temp. (° C.) | Current (Amps) | Resistance (Ohms) | Resistivity |
|---|---|---|---|
| 252 | $1.0 \times 10^{-8}$ | $4.3 \times 10^{9}$ | $3.7 \times 10^{11}$ |
| 228 | $3.4 \times 10^{-9}$ | $1.2 \times 10^{10}$ | $1.1 \times 10^{12}$ |
| 200 | $0.9 \times 10^{-10}$ | $4.6 \times 10^{10}$ | $3.9 \times 10^{12}$ |
| 186 | $2.6 \times 10^{-10}$ | $1.6 \times 10^{11}$ | $1.4 \times 10^{13}$ |
| 127 | $0.3 \times 10^{-12}$ | $1.9 \times 10^{14}$ | $1.7 \times 10^{15}$ |

[Pyrolysis Temp.: 302° C.]

| Cooling Temp. (° C.) | Current (Amps) | Resistance (Ohms) | Resistivity |
|---|---|---|---|
| 260 | $2.0 \times 10^{-9}$ | $2.2 \times 10^{10}$ | $1.9 \times 10^{12}$ |
| 198 | $2.2 \times 10^{-10}$ | $1.9 \times 10^{11}$ | $1.7 \times 10^{13}$ |
| 163 | $2.0 \times 10^{-11}$ | $2.2 \times 10^{12}$ | $1.9 \times 10^{14}$ |
| 138 | $1.6 \times 10^{-12}$ | $2.7 \times 10^{13}$ | $2.3 \times 10^{15}$ |
| 97 | $0.4 \times 10^{-12}$ | $1.1 \times 10^{14}$ | $9.6 \times 10^{15}$ |

TABLE III—*Continued*
[Pyrolysis Temp.: 316° C.]

| Cooling Temp. (° C.) | Current (Amps) | Resistance (Ohms) | Resistivity |
|---|---|---|---|
| 260 | $3.9 \times 10^{-9}$ | $1.1 \times 10^{10}$ | $9.1 \times 10^{11}$ |
| 200 | $5.0 \times 10^{-10}$ | $8.0 \times 10^{10}$ | $6.9 \times 10^{12}$ |
| 164 | $1.0 \times 10^{-10}$ | $4.4 \times 10^{11}$ | $3.9 \times 10^{13}$ |
| 121 | $3.4 \times 10^{-12}$ | $1.2 \times 10^{13}$ | $1.1 \times 10^{15}$ |
| 91 | $0.8 \times 10^{-12}$ | $5.5 \times 10^{13}$ | $4.8 \times 10^{15}$ |

[Pyrolysis Temp.: 330° C.]

| Cooling Temp. (° C.) | Current (Amps) | Resistance (Ohms) | Resistivity |
|---|---|---|---|
| 260 | $1.7 \times 10^{-8}$ | $2.5 \times 10^{9}$ | $2.2 \times 10^{11}$ |
| 197 | $1.6 \times 10^{-9}$ | $2.7 \times 10^{10}$ | $2.3 \times 10^{12}$ |
| 142 | $5.2 \times 10^{-11}$ | $7.7 \times 10^{11}$ | $6.6 \times 10^{13}$ |
| 104 | $0.8 \times 10^{-11}$ | $5.5 \times 10^{12}$ | $4.8 \times 10^{14}$ |
| 48 | $0.7 \times 10^{-12}$ | $6.3 \times 10^{13}$ | $5.4 \times 10^{15}$ |

[Pyrolysis Temp.: 343° C.]

| Cooling Temp. (° C.) | Current (Amps) | Resistance (Ohms) | Resistivity |
|---|---|---|---|
| 260 | $1.4 \times 10^{-8}$ | $3.1 \times 10^{9}$ | $2.7 \times 10^{11}$ |
| 216 | $3.1 \times 10^{-9}$ | $1.4 \times 10^{10}$ | $1.2 \times 10^{12}$ |
| 143 | $2.0 \times 10^{-10}$ | $2.2 \times 10^{11}$ | $1.9 \times 10^{13}$ |
| 93 | $2.0 \times 10^{-11}$ | $2.2 \times 10^{12}$ | $1.9 \times 10^{14}$ |
| 38 | $1.2 \times 10^{-12}$ | $3.7 \times 10^{13}$ | $3.1 \times 10^{15}$ |

[Pyrolysis Temp.: 360° C.]

| Cooling Temp. (° C.) | Current (Amps) | Resistance (Ohms) | Resistivity |
|---|---|---|---|
| 257 | $2.9 \times 10^{-8}$ | $1.5 \times 10^{9}$ | $1.3 \times 10^{11}$ |
| 220 | $1.4 \times 10^{-8}$ | $3.1 \times 10^{9}$ | $2.7 \times 10^{11}$ |
| 132 | $1.1 \times 10^{-9}$ | $3.3 \times 10^{10}$ | $3.3 \times 10^{12}$ |
| 97 | $3.0 \times 10^{-10}$ | $1.4 \times 10^{11}$ | $1.2 \times 10^{13}$ |
| 62 | $6.6 \times 10^{-11}$ | $5.9 \times 10^{11}$ | $5.1 \times 10^{13}$ |

[Pyrolysis Temp.: 371° C.]

| Cooling Temp. (° C.) | Current (Amps) | Resistance (Ohms) | Resistivity |
|---|---|---|---|
| 260 | $1.2 \times 10^{-7}$ | $3.7 \times 10^{8}$ | $3.1 \times 10^{10}$ |
| 204 | $3.1 \times 10^{-8}$ | $1.4 \times 10^{9}$ | $1.2 \times 10^{11}$ |
| 160 | $1.0 \times 10^{-8}$ | $4.4 \times 10^{9}$ | $3.8 \times 10^{11}$ |
| 82 | $0.9 \times 10^{-9}$ | $5.5 \times 10^{10}$ | $4.8 \times 10^{12}$ |
| 32 | $1.9 \times 10^{-10}$ | $2.3 \times 10^{11}$ | $1.9 \times 10^{13}$ |

[Pyrolysis Temp.: 385° C.]

| Cooling Temp. (° C.) | Current (Amps) | Resistance (Ohms) | Resistivity |
|---|---|---|---|
| 260 | $2.7 \times 10^{-7}$ | $1.6 \times 10^{8}$ | $1.4 \times 10^{10}$ |
| 204 | $1.0 \times 10^{-7}$ | $4.4 \times 10^{8}$ | $3.9 \times 10^{10}$ |
| 160 | $3.6 \times 10^{-8}$ | $1.6 \times 10^{9}$ | $9.9 \times 10^{10}$ |
| 93 | $1.0 \times 10^{-8}$ | $4.4 \times 10^{9}$ | $3.8 \times 10^{11}$ |
| 39 | $2.3 \times 10^{-9}$ | $1.9 \times 10^{10}$ | $1.6 \times 10^{12}$ |

[Pyrolysis Temp.: 399° C.]

| Cooling Temp. (° C.) | Current (Amps) | Resistance (Ohms) | Resistivity |
|---|---|---|---|
| 260 | $1.6 \times 10^{-4}$ | $2.7 \times 10^{5}$ | $2.3 \times 10^{7}$ |
| 188 | $1.2 \times 10^{-4}$ | $3.7 \times 10^{5}$ | $3.1 \times 10^{7}$ |
| 106 | $0.9 \times 10^{-4}$ | $4.7 \times 10^{5}$ | $3.9 \times 10^{7}$ |
| 62 | $6.0 \times 10^{-5}$ | $6.5 \times 10^{5}$ | $5.6 \times 10^{7}$ |
| 36 | $5.3 \times 10^{-5}$ | $7.5 \times 10^{5}$ | $6.4 \times 10^{7}$ |

Figure 4:
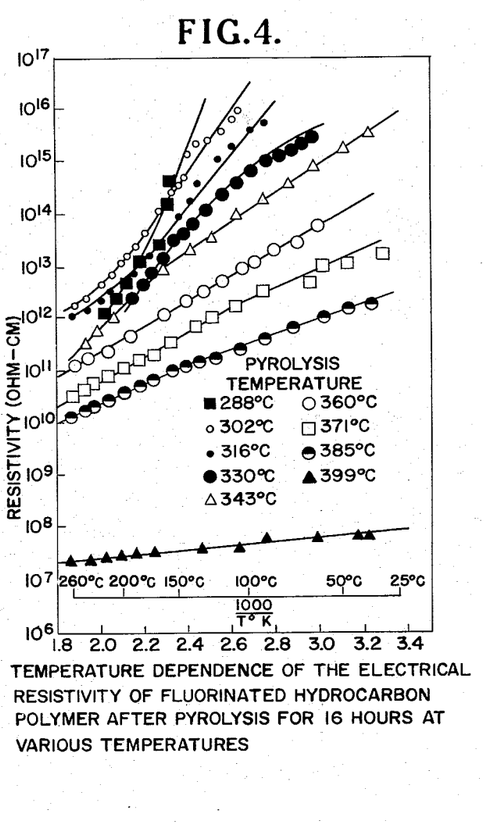
FIG. 4 is a graph showing electrical resistivity plotted as a function of the reciprocal of the absolute temperature at which the data points were obtained for a series of non-isothermal degradations of a fluorinated hydrocarbon polymer containing bound styrene.

The data from Table III have been correlated in FIG. 4 and it can be seen that this polymer exhibited maximum values for both the magnitude and temperature dependence of the resistivity after pyrolysis at 288° C. Once these maximum values were attained, however, additional heating at higher temperature resulted in a progressive decrease in both the magnitude and temperature dependence of resistivity. For example, pyrolysis at 302° C. resulted in the onset of degradation. After pyrolysis at 385° C. an increase of only 14° C. resulted in a major change in both the magnitude and temperature dependence of the resistivity. It appears that an abrupt increase in the rate of carbon formation occurred between these two temperatures. The final resistivity magnitude approached the semi-conductor range of $10^7$ ohm-cm. and the temperature dependence was close to that of carbon. These abrupt changes in the two parameters suggests that above 385° C. the last remaining portions of organic polymer were decomposed and a residue was produced which was essentially a form of carbon. Also, it appears that this carbonaceous residue is a semi-conductor.

Example IV

An epoxylated-novolac resin was polymerized using 100 percent, by weight, of a catalyst consisting of the methylated maelic acid adduct of phthalic anhydride having the following structural formula:

TABLE IV.—DEGRADTION OF EPOXYLATED-NOVOLAC POLYMER (16 HOURS)

[Pyrolysis Temp.: 260° C.]

| Cooling Temp. (° C.) | Current (Amps) | Resistance (Ohms) | Resistivity |
|---|---|---|---|
| 242 | $3.4 \times 10^{-9}$ | $1.2 \times 10^{10}$ | $1.1 \times 10^{12}$ |
| 227 | $0.9 \times 10^{-9}$ | $4.5 \times 10^{10}$ | $3.9 \times 10^{12}$ |
| 192 | $1.3 \times 10^{-10}$ | $3.4 \times 10^{11}$ | $2.9 \times 10^{13}$ |
| 167 | $1.9 \times 10^{-11}$ | $2.3 \times 10^{12}$ | $1.9 \times 10^{14}$ |
| 142 | $0.4 \times 10^{-11}$ | $1.2 \times 10^{13}$ | $1.0 \times 10^{15}$ |

[Pyrolysis Temp.: 208° C.]

| Cooling Temp. (° C.) | Current (Amps) | Resistance (Ohms) | Resistivity |
|---|---|---|---|
| 259 | $6.7 \times 10^{-8}$ | $5.7 \times 10^{8}$ | $4.9 \times 10^{10}$ |
| 211 | $6.0 \times 10^{-9}$ | $6.5 \times 10^{9}$ | $5.6 \times 10^{11}$ |
| 141 | $1.6 \times 10^{-10}$ | $2.7 \times 10^{11}$ | $2.3 \times 10^{13}$ |
| 79 | $0.8 \times 10^{-11}$ | $5.5 \times 10^{12}$ | $4.8 \times 10^{14}$ |
| 42 | $0.9 \times 10^{-12}$ | $4.6 \times 10^{13}$ | $3.9 \times 10^{15}$ |

[Pyrolysis Temp.: 300° C.]

| Cooling Temp. (° C.) | Current (Amps) | Resistance (Ohms) | Resistivity |
|---|---|---|---|
| 251 | $3.2 \times 10^{-6}$ | $1.3 \times 10^{7}$ | $1.1 \times 10^{9}$ |
| 197 | $1.2 \times 10^{-6}$ | $3.7 \times 10^{7}$ | $3.1 \times 10^{9}$ |
| 147 | $3.7 \times 10^{-7}$ | $1.1 \times 10^{8}$ | $9.6 \times 10^{9}$ |
| 84 | $5.6 \times 10^{-8}$ | $7.0 \times 10^{8}$ | $6.0 \times 10^{10}$ |
| 31 | $0.9 \times 10^{-8}$ | $4.9 \times 10^{9}$ | $4.2 \times 10^{11}$ |

Figure 5:
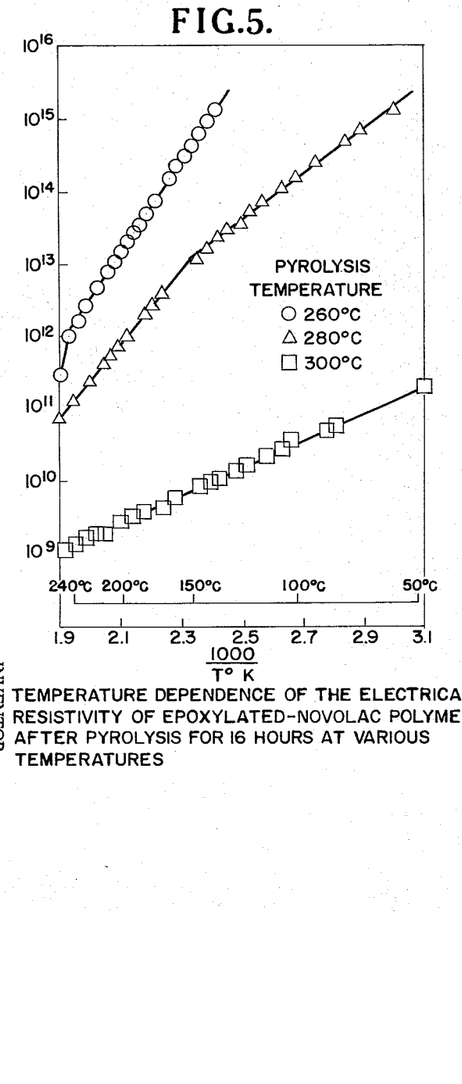
FIGS. 5 and 6 are graphs showing electrical resistivity plotted as a function of the reciprocal of the absolute temperature at which the data points were obtained for a series of non-isothermal degradations of epoxylated novolac polymers.

From the data obtained and illustrated in Table IV and FIG. 5, this polymer appeared thermally stable up to 260° C., since the maximum magnitude and temperature dependence values were found after heating at this temperature. Above 260° C. degradation begins, as is evidenced by the decrease in the values of both the magnitude and temperature dependence of the resistivity. After pyrolysis at 300° C. the polymer crumbled and measurements were no longer possible. However, the expected progressive decrease in the two electrical parameters was observed.

Example V

Another expoxylated-novolac resin was polymerized using the catalyst of Example IV.

TABLE V.—DEGRADATION OF EPOXYLATED-NOVOLAC POLYMER (16 HOURS)

[Pyrolysis Temp. 260° C.]

| Cooling Temp. (° C.) | Current (Amps) | Resistance (Ohms) | Resistivity |
|---|---|---|---|
| 260 | $2.8 \times 10^{-7}$ | $1.5 \times 10^{8}$ | $1.3 \times 10^{10}$ |
| 199 | $0.3 \times 10^{-8}$ | $1.5 \times 10^{10}$ | $1.3 \times 10^{12}$ |
| 143 | $0.3 \times 10^{-10}$ | $1.5 \times 10^{12}$ | $1.3 \times 10^{14}$ |
| 99 | $2.0 \times 10^{-12}$ | $2.2 \times 10^{13}$ | $1.9 \times 10^{15}$ |
| 57 | $0.1 \times 10^{-12}$ | $4.5 \times 10^{14}$ | $3.9 \times 10^{16}$ |

[Pyrolysis Temp.: 316° C.]

| Cooling Temp. (° C.) | Current (Amps) | Resistance (Ohms) | Resistivity |
|---|---|---|---|
| 260 | $1.1 \times 10^{-7}$ | $4.2 \times 10^{8}$ | $3.6 \times 10^{10}$ |
| 230 | $3.6 \times 10^{-8}$ | $1.2 \times 10^{9}$ | $9.9 \times 10^{10}$ |
| 189 | $0.9 \times 10^{-8}$ | $5.2 \times 10^{9}$ | $4.5 \times 10^{11}$ |
| 112 | $2.2 \times 10^{-10}$ | $1.9 \times 10^{11}$ | $1.7 \times 10^{13}$ |
| 74 | $1.5 \times 10^{-11}$ | $2.8 \times 10^{12}$ | $2.4 \times 10^{14}$ |

TABLE V—Continued

[Pyrolysis Temp.: 343° C.]

| Cooling Temp. (° C.) | Current (Amps) | Resistance (Ohms) | Resistivity |
|---|---|---|---|
| 251 | $1.9 \times 10^{-8}$ | $2.3 \times 10^{9}$ | $1.9 \times 10^{11}$ |
| 188 | $0.5 \times 10^{-8}$ | $8.2 \times 10^{9}$ | $7.1 \times 10^{11}$ |
| 153 | $0.9 \times 10^{-9}$ | $4.2 \times 10^{10}$ | $3.6 \times 10^{12}$ |
| 110 | $1.4 \times 10^{-10}$ | $3.2 \times 10^{11}$ | $2.7 \times 10^{13}$ |
| 61 | $1.4 \times 10^{-11}$ | $3.2 \times 10^{12}$ | $2.7 \times 10^{14}$ |

[Pyrolysis Temp. 371° C.]

| Cooling Temp. (° C.) | Current (Amps) | Resistance (Ohms) | Resistivity |
|---|---|---|---|
| 259 | $1.8 \times 10^{-7}$ | $2.4 \times 10^{8}$ | $2.1 \times 10^{10}$ |
| 206 | $3.8 \times 10^{-8}$ | $1.1 \times 10^{9}$ | $9.3 \times 10^{10}$ |
| 161 | $1.2 \times 10^{-8}$ | $3.7 \times 10^{9}$ | $3.1 \times 10^{11}$ |
| 104 | $2.2 \times 10^{-9}$ | $1.9 \times 10^{10}$ | $1.7 \times 10^{12}$ |
| 51 | $4.2 \times 10^{-10}$ | $9.7 \times 10^{10}$ | $8.4 \times 10^{12}$ |

Figure 6:
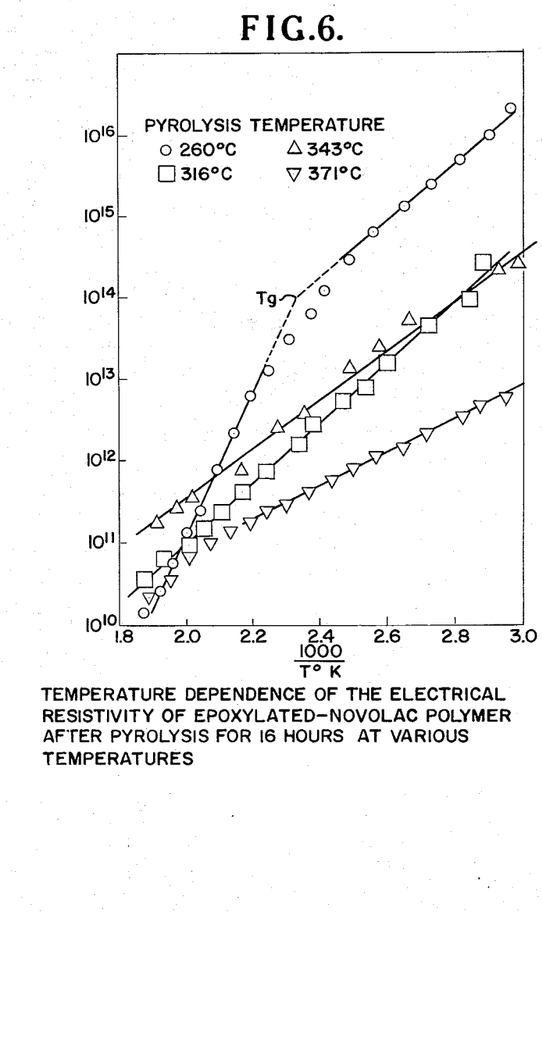

Initially, this polymer was given a post polymerization at 260° C., and the resultant resistivity vs. temperature plot is indicated in FIG. 6. The magnitude and temperature dependence of the resistivity of this completely polymerized polymer suggests that the extent of polymerization was not high. The change in slope of resistivity vs. temperature plot at about 155° C. is indicative of a glass or second order transition. After pyrolysis at 371° C. the polymer crumbled and additional measurement was not possible. The maximum slope is exhibited by the resistivity vs. temperature plot taken at 316° C. and this indicated that the polymer is not thermally stable (at least for the 16 hour pyrolysis time) at temperatures above about 260° C.

Example VI

A silicone polymer was polymerized using a catalyst consisting of 1 percent by weight of dibutyl tin dilaurate.

TABLE VI.—DEGRADATION OF SILICONE POLYMER (16 HOURS)

[Pyrolysis Temp.: 260° C.]

| Cooling Temp. (° C.) | Current (Amps) | Resistance (Ohms) | Resistivity |
|---|---|---|---|
| 257 | $1.6 \times 10^{-9}$ | $2.7 \times 10^{10}$ | $2.3 \times 10^{12}$ |
| 195 | $5.4 \times 10^{-10}$ | $7.3 \times 10^{10}$ | $6.3 \times 10^{12}$ |
| 142 | $1.4 \times 10^{-10}$ | $3.1 \times 10^{11}$ | $2.7 \times 10^{13}$ |
| 95 | $2.4 \times 10^{-11}$ | $1.8 \times 10^{12}$ | $1.5 \times 10^{14}$ |
| 35 | $2.2 \times 10^{-12}$ | $1.9 \times 10^{13}$ | $1.7 \times 10^{15}$ |

[Pyrolysis Temp.: 288° C.]

| Cooling Temp. (° C.) | Current (Amps) | Resistance (Ohms) | Resistivity |
|---|---|---|---|
| 237 | $0.4 \times 10^{-10}$ | $1.1 \times 10^{12}$ | $9.6 \times 10^{13}$ |
| 206 | $1.6 \times 10^{-11}$ | $2.7 \times 10^{12}$ | $1.3 \times 10^{14}$ |
| 150 | $3.0 \times 10^{-12}$ | $1.4 \times 10^{13}$ | $1.2 \times 10^{15}$ |
| 111 | $0.9 \times 10^{-12}$ | $4.9 \times 10^{13}$ | $4.2 \times 10^{15}$ |
| 86 | $0.4 \times 10^{-12}$ | $1.1 \times 10^{14}$ | $9.6 \times 10^{16}$ |

[Pyrolysis Temp.: 427° C.]

| Cooling Temp. (° C.) | Current (Amps) | Resistance (Ohms) | Resistivity |
|---|---|---|---|
| 260 | $0.2 \times 10^{-6}$ | $2.2 \times 10^{8}$ | $1.9 \times 10^{10}$ |
| 216 | $0.6 \times 10^{-7}$ | $7.4 \times 10^{8}$ | $6.4 \times 10^{10}$ |
| 171 | $0.7 \times 10^{-8}$ | $6.3 \times 10^{9}$ | $5.4 \times 10^{11}$ |
| 127 | $0.6 \times 10^{-9}$ | $7.3 \times 10^{10}$ | $2.4 \times 10^{12}$ |
| 93 | $0.5 \times 10^{-10}$ | $8.9 \times 10^{11}$ | $7.7 \times 10^{13}$ |

[Pyrolysis Temp.: 460° C.]

| Cooling Temp. (° C.) | Current (Amps) | Resistance (Ohms) | Resistivity |
|---|---|---|---|
| 260 | $0.4 \times 10^{-5}$ | $1.1 \times 10^{7}$ | $9.6 \times 10^{8}$ |
| 204 | $0.4 \times 10^{-6}$ | $1.1 \times 10^{8}$ | $9.6 \times 10^{9}$ |
| 154 | $0.5 \times 10^{-7}$ | $8.9 \times 10^{8}$ | $7.7 \times 10^{11}$ |
| 116 | $2.0 \times 10^{-8}$ | $2.2 \times 10^{9}$ | $1.9 \times 10^{11}$ |
| 82 | $5.0 \times 10^{-8}$ | $8.0 \times 10^{8}$ | $6.9 \times 10^{10}$ |

[Pyrolysis Temp.: 488° C.]

| Cooling Temp. (° C.) | Current (Amps) | Resistance (Ohms) | Resistivity |
|---|---|---|---|
| 260 | $1.9 \times 10^{-6}$ | $2.3 \times 10^{7}$ | $1.9 \times 10^{9}$ |
| 193 | $1.1 \times 10^{-7}$ | $3.9 \times 10^{8}$ | $3.4 \times 10^{10}$ |
| 121 | $1.7 \times 10^{-8}$ | $2.6 \times 10^{9}$ | $2.2 \times 10^{11}$ |
| 74 | $1.6 \times 10^{-7}$ | $2.7 \times 10^{8}$ | $2.3 \times 10^{10}$ |
| 28 | $2.8 \times 10^{-6}$ | $1.5 \times 10^{7}$ | $1.3 \times 10^{9}$ |

TABLE VI—Continued

[Pyrolysis Temp.: 540° C.]

| Cooling Temp. (° C.) | Current (Amps) | Resistance (Ohms) | Resistivity |
|---|---|---|---|
| 260 | $4.0 \times 10^{-5}$ | $1.0 \times 10^6$ | $8.8 \times 10^8$ |
| 199 | $2.0 \times 10^{-7}$ | $2.2 \times 10^8$ | $1.9 \times 10^{10}$ |
| 121 | $2.6 \times 10^{-8}$ | $1.6 \times 10^9$ | $1.4 \times 10^{11}$ |
| 88 | $5.1 \times 10^{-8}$ | $7.8 \times 10^8$ | $6.7 \times 10^{10}$ |
| 28 | $0.3 \times 10^{-5}$ | $1.5 \times 10^7$ | $1.3 \times 10^9$ |

[Pyrolysis Temp.: 595° C.]

| Cooling Temp. (° C.) | Current (Amps) | Resistance (Ohms) | Resistivity |
|---|---|---|---|
| 260 | $0.2 \times 10^{-4}$ | $2.2 \times 10^6$ | $1.9 \times 10^8$ |
| 166 | $0.3 \times 10^{-6}$ | $1.5 \times 10^8$ | $1.3 \times 10^{10}$ |
| 99 | $0.6 \times 10^{-6}$ | $7.4 \times 10^7$ | $6.4 \times 10^9$ |
| 54 | $5.1 \times 10^{-7}$ | $7.8 \times 10^7$ | $6.7 \times 10^9$ |
| 27 | $1.5 \times 10^{-6}$ | $2.9 \times 10^7$ | $2.5 \times 10^9$ |

Figure 7:
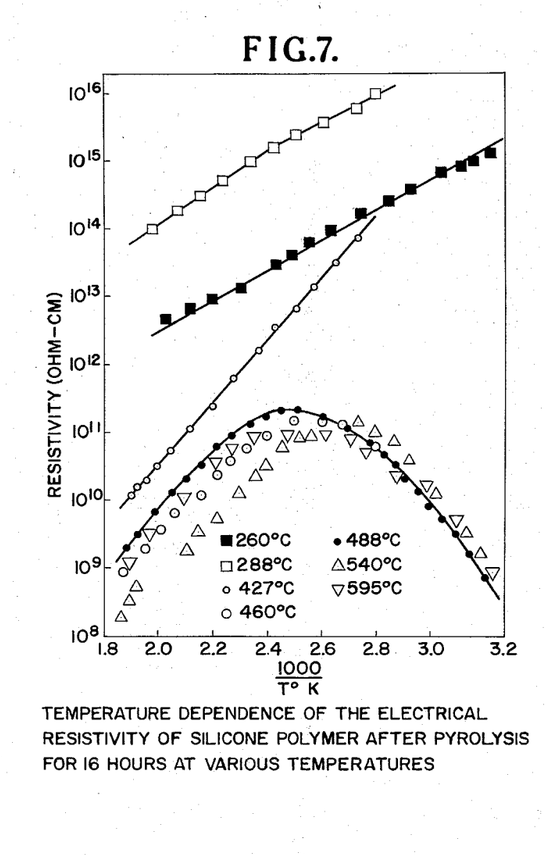
FIGS. 7 and 8 are graphs showing the electrical resistivity plotted as a function of the reciprocal of the absolute temperature at which the data points were obtained for a series of non-isothermal degradations of silicone polymers.

As indicated in the data of Table VI and in FIG. 7 the polymer was post polymerized for 16 hours at 260° C., and then heated to 288° C. Instead of degrading, this treatment resulted in some additional polymerization, as can be seen from inspection of the figure. Additional heating at higher temperatures degraded the polymer, as shown by the decrease in resistivity after 16 hours soaking at 427° C. Pyrolysis at temperatures above 427° C. produced a very unusual temperature dependence of the resistivity. Instead of the usual linear relationship, a non-linear temperature dependence was obtained. This non-linear dependence is reproduceable (note FIG. 8) even after pyrolysis at temperatures as high as 595° C. Such occurrence strongly suggests that pyrolysis at temperatures above 427° C. destroys the organic components of the polymer leaving the residue which consists primarily of silicon-oxygen chains. Additional evidence supporting this view is the fact that the residue, after pyrolysis at 595° C., consisted of a hard, brittle mass which appeared to be silica.

An explanation of the abnormal temperature dependence of the resistivity of the residue is difficult. However, it appears that some basic change occurs in the electrical conduction process of the silicious residue at about 100° C. A change from ionic to electronic conduction could explain this abnormal and negative temperature dependence. It is of interest that the magnitude of the resistivity of the residue is of the same order as has been found for purse silicon dioxide.

Example VII

Another silicone resin was polymerized using the catalyst of Example VI.

TABLE VII.—DEGRADATION OF SILICONE POLYMER

[Pyrolysis Temp.: 293° C.]

| Cooling Temp. (° C.) | Current (Amps) | Resistance (Ohms) | Resistivity |
|---|---|---|---|
| 259 | $2.4 \times 10^{-10}$ | $1.8 \times 10^{11}$ | $1.9 \times 10^{13}$ |
| 216 | $5.7 \times 10^{-11}$ | $6.9 \times 10^{11}$ | $5.9 \times 10^{13}$ |
| 166 | $1.5 \times 10^{-11}$ | $2.9 \times 10^{12}$ | $2.5 \times 10^{14}$ |
| 125 | $5.0 \times 10^{-12}$ | $8.0 \times 10^{13}$ | $6.9 \times 10^{14}$ |
| 72 | $1.7 \times 10^{-12}$ | $2.6 \times 10^{13}$ | $2.3 \times 10^{15}$ |

[Pyrolysis Temp.: 343° C.]

| Cooling Temp. (° C.) | Current (Amps) | Resistance (Ohms) | Resistivity |
|---|---|---|---|
| 260 | $2.6 \times 10^{-10}$ | $1.6 \times 10^{11}$ | $1.4 \times 10^{13}$ |
| 237 | $1.5 \times 10^{-10}$ | $2.9 \times 10^{11}$ | $2.5 \times 10^{13}$ |
| 196 | $5.0 \times 10^{-11}$ | $8.0 \times 10^{11}$ | $6.9 \times 10^{13}$ |
| 123 | $1.0 \times 10^{-11}$ | $4.4 \times 10^{13}$ | $3.8 \times 10^{14}$ |
| 84 | $3.0 \times 10^{-12}$ | $1.4 \times 10^{13}$ | $1.2 \times 10^{15}$ |

[Pyrolysis Temp.: 371° C.]

| Cooling Temp. (° C.) | Current (Amps) | Resistance (Ohms) | Resistivity |
|---|---|---|---|
| 159 | $1.4 \times 10^{-9}$ | $3.1 \times 10^{10}$ | $2.7 \times 10^{12}$ |
| 116 | $2.7 \times 10^{-10}$ | $1.6 \times 10^{11}$ | $1.4 \times 10^{13}$ |
| 96 | $1.0 \times 10^{-10}$ | $4.4 \times 10^{11}$ | $3.8 \times 10^{13}$ |
| 67 | $2.0 \times 10^{-11}$ | $2.2 \times 10^{12}$ | $1.9 \times 10^{14}$ |
| 31 | $1.6 \times 10^{-12}$ | $2.7 \times 10^{13}$ | $2.3 \times 10^{15}$ |

TABLE VII—Continued

[Pyrolysis Temp.: 400° C.]

| Cooling Temp. (° C.) | Current (Amps) | Resistance (Ohms) | Resistivity |
|---|---|---|---|
| 203 | $5.6 \times 10^{-10}$ | $7.0 \times 10^{10}$ | $6.1 \times 10^{12}$ |
| 167 | $2.4 \times 10^{-10}$ | $1.8 \times 10^{11}$ | $1.5 \times 10^{13}$ |
| 126 | $4.0 \times 10^{-11}$ | $1.0 \times 10^{12}$ | $8.8 \times 10^{13}$ |
| 97 | $1.1 \times 10^{-11}$ | $3.9 \times 10^{12}$ | $3.4 \times 10^{14}$ |
| 48 | $0.7 \times 10^{-12}$ | $6.8 \times 10^{13}$ | $5.9 \times 10^{15}$ |

[Pyrolysis Temp.: 427° C.]

| Cooling Temp. (° C.) | Current (Amps) | Resistance (Ohms) | Resistivity |
|---|---|---|---|
| 258 | $2.4 \times 10^{-9}$ | $1.8 \times 10^{10}$ | $1.5 \times 10^{12}$ |
| 209 | $3.6 \times 10^{-10}$ | $1.2 \times 10^{11}$ | $9.9 \times 10^{12}$ |
| 169 | $0.9 \times 10^{-10}$ | $4.9 \times 10^{11}$ | $4.2 \times 10^{13}$ |
| 99 | $2.3 \times 10^{-12}$ | $1.9 \times 10^{13}$ | $1.6 \times 10^{15}$ |
| 52 | $0.2 \times 10^{-12}$ | $2.2 \times 10^{14}$ | $1.9 \times 10^{16}$ |

[Pyrolysis Temp.: 468° C.]

| Cooling Temp. (° C.) | Current (Amps) | Resistance (Ohms) | Resistivity |
|---|---|---|---|
| 260 | $3.6 \times 10^{-7}$ | $1.2 \times 10^8$ | $9.9 \times 10^9$ |
| 206 | $3.3 \times 10^{-8}$ | $1.3 \times 10^9$ | $1.1 \times 10^{11}$ |
| 115 | $5.8 \times 10^{-9}$ | $6.8 \times 10^9$ | $5.8 \times 10^{11}$ |
| 81 | $2.6 \times 10^{-8}$ | $1.6 \times 10^9$ | $1.4 \times 10^{11}$ |
| 48 | $7.4 \times 10^{-7}$ | $5.1 \times 10^7$ | $4.4 \times 10^9$ |

[Pyrolysis Temp.: 538° C.]

| Cooling Temp. (° C.) | Current (Amps) | Resistance (Ohms) | Resistivity |
|---|---|---|---|
| 257 | $3.4 \times 10^{-7}$ | $1.2 \times 10^8$ | $1.1 \times 10^{10}$ |
| 198 | $3.2 \times 10^{-8}$ | $1.3 \times 10^9$ | $1.1 \times 10^{11}$ |
| 152 | $1.0 \times 10^{-8}$ | $4.4 \times 10^9$ | $3.8 \times 10^{11}$ |
| 121 | $1.0 \times 10^{-8}$ | $4.4 \times 10^9$ | $3.8 \times 10^{11}$ |
| 53 | $2.1 \times 10^{-6}$ | $2.0 \times 10^7$ | $1.8 \times 10^9$ |

[Pyrolysis Temp.: 649° C.]

| Cooling Temp. (° C.) | Current (Amps) | Resistance (Ohms) | Resistivity |
|---|---|---|---|
| 259 | $3.0 \times 10^{-3}$ | $1.4 \times 10^4$ | $1.2 \times 10^6$ |
| 202 | $4.6 \times 10^{-4}$ | $8.8 \times 10^4$ | $7.7 \times 10^6$ |
| 133 | $1.2 \times 10^{-4}$ | $3.7 \times 10^5$ | $3.1 \times 10^7$ |
| 88 | $1.6 \times 10^{-5}$ | $2.7 \times 10^6$ | $2.3 \times 10^8$ |
| 46 | $6.0 \times 10^{-6}$ | $6.5 \times 10^6$ | $5.6 \times 10^8$ |

Figure 8:
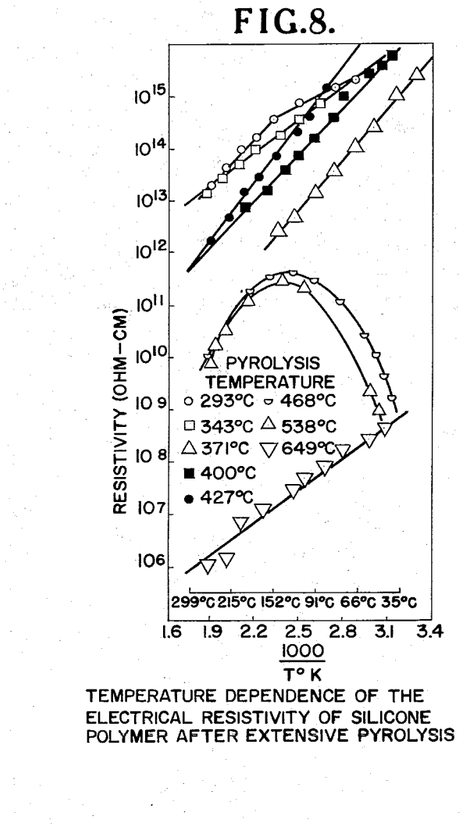

The data of Table VII as shown in FIG. 8 indicates that the magnitude and temperature dependence of the resistivity of this polymer do not initially exhibit the same progressive decrease over the pyrolysis range of 293° C. to 427° C. as do hydrocarbon polymers. This lack of order in the early stages of pyrolysis appears to be characteristic of silicone polymers. Another significant departure from the usual results was obtained in the later stages of the degradation. After pyrolysis at 468° C., the resistivity, instead of exhibiting the usual linear dependence, changed slope and direction of slope. The plots obtained after pyrolysis at 468° C. and 538° C. approximate parabolas. This very unusual temperature dependence of resistivity has not been previously observed with hydrocarbon polymers. It appears that some basic change occurs in the structure and/or the electrical conduction process of the pyrolysate over this temperature range. Once this temperature range is exceeded, the temperature dependence becomes normal, as is indicated by the results obtained after pyrolysis at 649° C. The final product obtained after degradation of the silicone polymer was a silicious residue which would be expected to exhibit the electrical properties of silicon dioxide.

As can be seen from the description of the preceding specific embodiments, the technique of ETA provides parameters useful in the elucidation of the thermal stability and thermal degradation characteristics of bulk polymers. For example, the ETA method may be used to follow isothermal degradations and from a series of isothermal degradations the activation energy for the degradation process may be calculated. Such information would aid in the understanding of the mechanism of the degradation of these complex systems. Moreover, electrical resistivity measurements made isothermally for long periods of time can be used to detect the onset of degradation in both propellant binders and solid propellants.

It is known that solid propellants progressively decompose over long periods of time. By incorporating electrodes into the solid propellant itself, the electrical volume resistivity of the propellant may be measured at intervals over long periods of time and the onset of the decomposition of the propellant thereby monitored.

Obviously many modifications and variations of the present invention are possible in the light of the above teachings. It is therefore to be understood that, within the scope of the appended claims, the invention may be practiced otherwise than as specifically described.

Having thus described the invention, what is claimed as new and desired to be secured by Letters Patent of the United States is:

1. The method of indicating the thermal stability of a bulk polymer which includes the steps of placing a sample of unpolymerized resin in heating means and polymerizing said sample, removing said sample from said heating means and allowing said sample to cool at ambient temperature, said sample having temperature indicating means partially internally disposed for indicating the temperature of said sample and resistivity indicating means partially internally disposed for indicating the resistivity of said sample, measuring the temperature and the resistivity of the sample, simultaneously at predetermined periods of time and taking the logarithm of the resistivity values, repeating the heating and cooling cycle, said heating cycle being at successively and progressively higher temperatures until the sample decomposes, plotting the logarithm of the electrical volume resistivity of the sample during each successive cooling cycle at predetermined intervals of time, plotting the logarithm of the resistivity against time and temperature, and connecting the plotted points whereby a plot is obtained which indicates the temperature of thermal stability and subsequent degradation of said bulk polymer.

2. The method of claim 1 in which the sample is pyrolyzed non-isothermally and the logarithm of the resistivity is plotted against the temperature of which the data points were obtained, that plot having the greatest slope indicating the initial temperature at which the polymer degrades.

3. The method of claim 1 in which the sample is pyrolyzed isothermally and the logarithm of the resistivity is plotted against time, that section of the plot which is horizontal being an indication of the thermal stability of said polymer over the indicated period of time.

4. The method of indicating the thermal stability and degradation rate of a bulk polymer which includes the steps of placing a first sample of unpolymerized resin in an oven and polymerizing said sample, removing said sample from said oven and allowing said sample to cool at ambient temperature, said sample having electrodes embedded therein and a thermocouple attached to, but insulated from, one of said electrodes, and electrodes being connected to means for indicating the current flowing between them and said thermocouple being connected to means for indicating the temperature of the polymer at the electrodes, repeating the heating and cooling cycle, measuring the temperature and the resistivity of the sample, simultaneously at predetermined periods of time and taking the logarithm of the resistivity values, said heating cycle being at successively and progressively higher temperatures until the sample decomposes, plotting the logarithm of the resistivity of said sample, during each cooling cycle, against the temperature at which the data points were obtained and connecting the plotted points whereby plots are obtained which indicate the thermal degradation of said first sample, polymerizing a second sample of said unpolymerized resin, heating said second sample at a temperature below the indicated thermal degradation temperature of said first sample, continuously plotting the logarithm resistivity of said second sample against time and for a predetermined period of time, and connecting the plotted points whereby a plot is obtained which indicates the time period of thermal stability of said second sample, and comparing the plot of the first sample with the plot of the second sample.

References Cited by the Examiner

UNITED STATES PATENTS

| | | | |
|---|---|---|---|
| 1,987,244 | 1/35 | Moore | 324—65 |
| 2,650,343 | 8/53 | Thompson | 324—65 X |
| 2,735,654 | 2/56 | Dravnieks | 324—65 |
| 2,638,529 | 5/53 | Gard | 324—65 X |
| 2,993,769 | 7/61 | Bice et al. | 149—19 |
| 3,049,410 | 8/62 | Warfield et al. | 23—230 |

WALTER L. CARLSON, *Primary Examiner.*

FREDRICK M. STRADER, *Examiner.*